United States Patent
Sesek

(10) Patent No.: US 7,051,088 B2
(45) Date of Patent: May 23, 2006

(54) SYSTEMS AND METHODS FOR PROVIDING OFF-LINE BACKUP OF A PROGRAMMABLE DEVICE'S CONFIGURATION DATA TO USERS OF PROGRAMMABLE DEVICES AT A SERVICE LOCATION

(75) Inventor: Robert Sesek, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 959 days.

(21) Appl. No.: 09/855,209

(22) Filed: May 14, 2001

(65) Prior Publication Data

US 2002/0169864 A1    Nov. 14, 2002

(51) Int. Cl.
*G06F 15/16* (2006.01)

(52) U.S. Cl. .............. 709/220; 709/223; 709/246; 713/1; 713/2

(58) Field of Classification Search ........... 709/220, 709/221, 223, 246; 717/11; 713/1, 2, 100; 710/110
See application file for complete search history.

(56) References Cited

U.S. PATENT DOCUMENTS

| | | | | |
|---|---|---|---|---|
| 5,771,381 A | * | 6/1998 | Jones et al. | 713/100 |
| 6,108,712 A | * | 8/2000 | Hayes, Jr. | 709/246 |
| 6,151,709 A | * | 11/2000 | Winkel | 717/173 |
| 6,181,212 B1 | * | 1/2001 | Khoini-Poorfard et al. | 331/16 |
| 6,192,416 B1 | * | 2/2001 | Baxter | 709/248 |
| 6,209,089 B1 | * | 3/2001 | Selitrennikoff et al. | 713/2 |
| 6,301,612 B1 | * | 10/2001 | Selitrennikoff et al. | 709/220 |
| 6,578,042 B1 | * | 6/2003 | Arrouye et al. | 707/102 |
| 6,581,117 B1 | * | 6/2003 | Klein et al. | 710/110 |
| 6,684,242 B1 | * | 1/2004 | Bahlmann | 709/222 |
| 6,763,458 B1 | * | 7/2004 | Watanabe et al. | 713/100 |

\* cited by examiner

*Primary Examiner*—Andrew Caldwell
*Assistant Examiner*—Stephan Willett

(57) ABSTRACT

Systems and methods for providing support services to users of programmable devices are provided. One of many possible methods for providing support services for a plurality of programmable devices associated with a plurality of users involves the steps of: receiving user-specific data associated with one of the programmable devices and the corresponding user; storing the user-specific data associated with the programmable device and the corresponding user; receiving notification that a replacement programmable device for the programmable device is needed by the user; and configuring the replacement programmable device based on the user-specific data associated with the programmable device and the corresponding user. The method may further involve the steps of: providing the replacement programmable device to the user; receiving the programmable device; repairing the programmable device; providing the repaired programmable device to the user; receiving the replacement programmable device from the user; and receiving payment for providing the support services to the user.

20 Claims, 8 Drawing Sheets

SYSTEMS AND METHODS FOR PROVIDING OFF-LINE BACKUP OF A PROGRAMMABLE DEVICE'S CONFIGURATION DATA TO USERS OF PROGRAMMABLE DEVICES AT A SERVICE LOCATION

TECHNICAL FIELD

The present invention is generally related to systems and methods for providing technical support to users of personal computers.

BACKGROUND OF THE INVENTION

Presently, there are numerous types of programmable devices, such as, personal computers (PCs), laptop PCs, personal digital assistants (PDAs), and wireless telephones to name a few, that provide applications to users and which are configured to communicate with a communications network. These programmable devices may be configured with any of a variety of user applications. For instance, laptops and personal computers are typically configured to provide word processing applications, spreadsheet applications, presentation applications, e-mail client applications, web browser applications, financial applications, enterprise applications, and other desirable applications. PDAs are typically configured with calendar applications, task and contact management applications, financial applications, and others. Some PDAs may also be configured with e-mail applications, web browser applications, and a host of other network-related applications. With technology advances, wireless telephones are now configured with many of the applications previously reserved for PDAs.

Furthermore, technological advances in the areas of networking, microprocessing, and integrated circuits, have also enabled the commercialization of new classes of devices that may be configured to provide less sophisticated applications but are still configured for communication with a network. Currently, there exists thousands of these so-called network-enabled devices, and many more are expected in the future. In fact, many in the art envision a future in which most, if not all, computing devices in the home or office environment are network-enabled.

For many users, these programmable devices and the applications they provide have become indispensable. For instance, many large corporations provide programmable devices, such as laptop PCs, to employees. In many cases, these employees rely on the applications provided by the programmable devices to perform their job functions. When a programmable device is lost, stolen, or becomes inoperable, a user is not able to use the programmable device until it is recovered and/or repaired. Even if the programmable device is not essential for performing job functions, users may still experience varying levels of inconvenience or frustration when the programmable device is no longer available for use. Obviously, such a loss is undesirable and problematic. Thus, there is a need in the industry to address these and/or other deficiencies and inadequacies.

SUMMARY OF THE INVENTION

The present invention provides systems and methods for providing support services to users of programmable devices.

Briefly described, in architecture, one of many possible embodiments is a programmable device that provides a user application and is configured to communicate with a network. The programmable device may comprise a processing device configured to control the operation of the programmable device, a user interface configured to enable a user to interact with the user application, a network interface device configured to enable the programmable device to communicate with the network, and memory comprising the user application and logic configured to provide user-specific data associated with the user application to the network. The user-specific data may comprise information capable of being used to configure a replacement programmable device for the user.

The present invention may also be viewed as providing one or more methods for providing support services for a plurality of programmable devices associated with a plurality of users. Briefly, one such method involves the steps of: receiving user-specific data associated with one of the programmable devices and the corresponding user; storing the user-specific data associated with the programmable device and the corresponding user; receiving notification that a replacement programmable device for the programmable device is needed by the user; and configuring the replacement programmable device based on the user-specific data associated with the programmable device and the corresponding user. The method may further involve the steps of: providing the replacement programmable device to the user; receiving the programmable device; repairing the programmable device; providing the repaired programmable device to the user; receiving the replacement programmable device from the user; and receiving payment for providing the support services to the user.

The present invention also provides systems for providing support services to a plurality of programmable devices associated with a plurality of users. One such system may comprise means for receiving user-specific data associated with each of the plurality of programmable devices and the corresponding user, means for storing the user-specific data associated with each of the plurality of programmable devices and the corresponding user, means for receiving notification that a replacement programmable device for one of the plurality of programmable devices is needed by the corresponding user, and means for configuring the replacement programmable device based on the user-specific data associated with the one of the plurality of programmable devices and the corresponding user. The system may further comprise means for providing the replacement programmable device to the corresponding user and means for receiving payment for providing the support services to the corresponding user.

The present invention also provides systems for providing support services for a network supporting a plurality of programmable devices, wherein each of the plurality of programmable devices is associated with a user and configured to connect to and communicate with the network. One such system may comprise the following: means for receiving user-specific data associated with one of the plurality of programmable devices supported by the network and the corresponding user, the user-specific data comprising information capable of being used to configure a replacement programmable device for the user; means for receiving notification that a replacement programmable device for one of the plurality of programmable devices supported by the network is needed by the corresponding user; and means for configuring the replacement programmable device based on the user-specific data.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF A PREFERRED EMBODIMENT

I. System Overview

Figure 1:
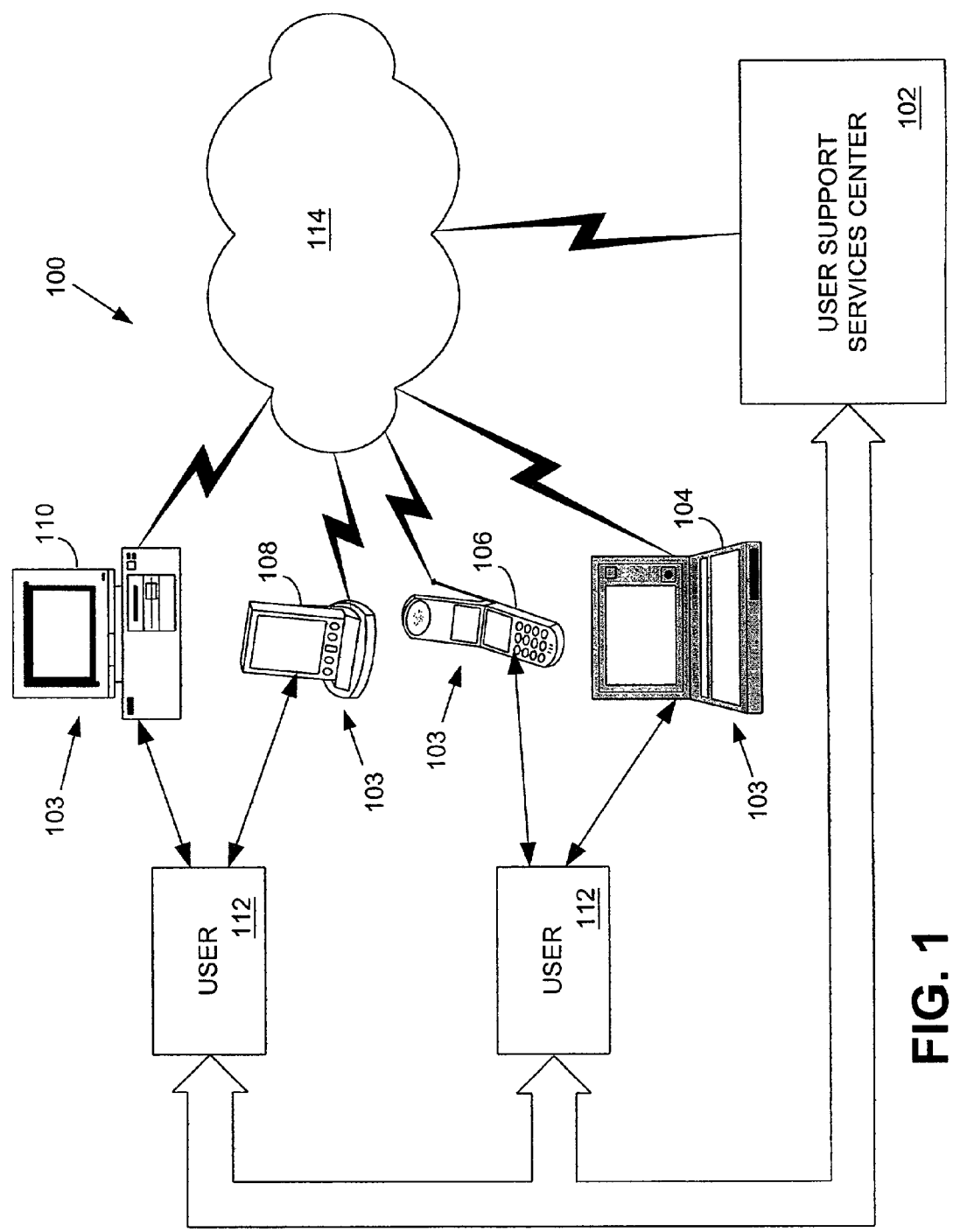
FIG. 1 is a schematic diagram of one of a number of embodiments of a system for providing support services to a plurality of programmable devices.

FIG. 1 illustrates a system 100 for providing support services to a plurality of programmable devices. System 100 may comprise a user support services center 102, various programmable devices 103, users 112, and communications network 114. Each user 112 may have one or more programmable devices 103, each of which are configured to communicate with user support services center 102 via communications network 114.

Communications network 114 may be any type of communication network employing any network topology, transmission medium, or network protocol. For example, communications network 114 may be a local area network (LAN), a metropolitan area network (MAN), a wide area network (WAN), any public or private packet-switched or other data network, including the Internet, circuit-switched networks, such as the public switched telephone network (PSTN), wireless networks, or any other desired communications infrastructure.

Programmable devices 103 may be any of a variety of computing devices that are configured to provide one or more user applications to a user 112 and are also configured to communicate with user support services center 102 via communications network 114. For example, as illustrated in FIG. 1, programmable device 103 may be a laptop personal computer (PC) 104, a wireless telephone 106, a personal digital assistant (PDA) 108, a personal computer 110, or any other known or future programmable device that provides one or more user applications to user 112 and supports communications via communications network 114.

As understood by one of ordinary skill in the art, the precise configuration of communications network 114 and the user application provided by programmable device 103 is not critical. The important aspect of system 100 is that user support services center 102 and programmable devices 103 are configured to enable users 112 to efficiently obtain a replacement for programmable devices 103 in the event that any of a variety of situations, such as programmable device 103 being lost, stolen, or becoming inoperable, occurs. More importantly, system 100 enables the user 112 to quickly and efficiently obtain a replacement for programmable device 103, which is customized with any of a variety of user-specific data from the original programmable device 103.

Furthermore, as described in more detail below, system 100 may be implemented in a variety of ways. For example, in some embodiments, system 100 may be implemented by a manufacturer of the various programmable devices 103, or any entity affiliated with the manufacturer, to provide user support services to users 112 that purchase programmable devices 103 from the manufacturer. In other embodiments, such as where programmable devices 103 are personal computers 110, laptop PCs 104, or other similar programmable devices provided to employees or members of an organization, system 100 may be implemented by the organization to provide user supports services to the employees or members. In further embodiments, system 100 may be leveraged as an application service provider, which enables manufacturers, organizations, or other similar entities to outsource their user support services.

However, as understood by one of ordinary skill in the art, depending on the particular needs and/or desires of the entity providing the user support services related to system 100, some of the various aspects of system 100 may be implemented in one embodiment, and the remaining aspects may be implemented in another embodiment. For example, a large corporation that provides a programmable device 103, such as a laptop PC 104, a desktop 110, a PDA 108, or any other programmable device to employees, may implement some aspects of system 100 within the technical support department of the corporation. In these situations, all direct communications with programmable devices 103 (described in detail below with respect to FIGS. 2–5) may occur via the corporation's internal communication network. The user-specific data associated with programmable devices 103 may be provided to an internal server via a LAN. However, the corporation may find it more feasible to outsource the remaining service related to system 100. For example, the services related to configuring the replacement programmable device and delivering the replacement programmable device to the user 112 (described in detail below with respect to FIGS. 6–8) may be performed by a user support services provider or application service provider.

Furthermore, as understood by one of ordinary skill in the art, it may be particularly advantageous to implement system 100 in circumstances where programmable devices 103 are standardized. For example, large corporations may provide their employees with standardized programmable devices 103, such as laptop PCs 104, desktop PCs 110, PDAs 108, or any other programmable devices. Each standardized programmable device 103 provided to an employee may be configured with the same operating system 312, applications 314, processing device 302, local interface 310, network interface device(s) 306, and user interface device(s) 308. Each standardized programmable device 103 may also be configured with user support services data generation module 318, user support services data 316, and user support services control module 320.

Although programmable devices 103 may be standardized when provided to users 112, as users 112 interact with programmable devices 103, various aspects of operating system 312 and applications 314 may be customized by users 112. For instance, where programmable device 103 is a laptop PC 104 that includes an Internet browser application, a user 112 may personalize various functionality provided by the browser. In addition, applications 314 may enable users 112 to define and/or create additional user-specific data, such as, for example, document files, spreadsheet files, web pages, or any type of file supported by applications 314. As understood by one of ordinary skill in the art, by standardizing the programmable devices 103, user support services center 102 may more quickly and efficiently provide users 112 with replacements for programmable devices 103.

Figure 2:
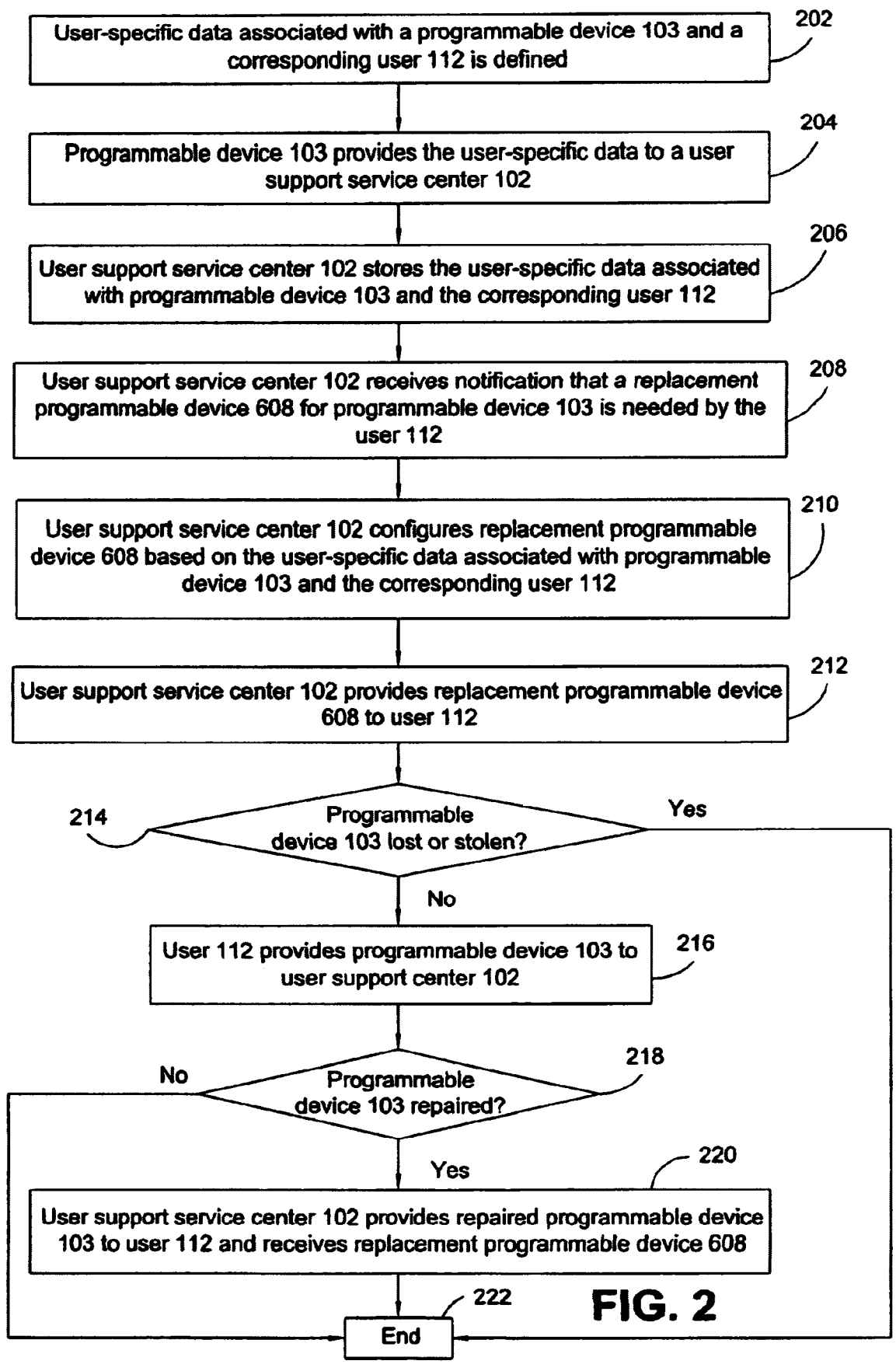
FIG. 2 is a flow chart illustrating the overall operation of the system of FIG. 1.

FIG. 2 is a flow chart illustrating the general operation of one of a number of embodiments of system 100 with respect to a single programmable device 103 associated with a user 112. At block 202, user-specific data associated with programmable device 103 and user 112 is defined. Depending on the particular configuration of programmable device 103, the user-specific data may comprise any of number of types of data. At block 204, programmable device 103 provides the user-specific data to user support services center 102. The precise transfer of the user-specific data from programmable device 103 to user support services center 102 is not critical. As understood by one of ordinary skill in the art, the transfer may be performed in a number of ways. For example, the transfer of the user-specific data may be controlled and/or customized by user 112, predefined and/or controlled by programmable device 103, or defined and/or controlled by user support services center 102.

At block 206, user support services center 102 stores the user-specific data associated with programmable device 103. User-specific data associated with each programmable device 103 and each user 112 may be stored in a database. At block 208, user support services center 102 receives notification that a replacement programmable device for a programmable device 103 should be provided to a user 112. This notification may be received in a number of ways. For instance, user 112 may request a replacement programmable device because programmable device 103 is lost, stolen, inoperable, or simply due to a minor malfunction. The request may be made, for example, via communications network 114, some other communications network, a telephone, electronic mail, or mail. The request from the user 112 may automatically trigger the notification to user support services center 102. In other embodiments, user support services center 102, or a service agent associated with user support services center 102, may perform some preliminary inquiry to determine whether a replacement programmable device should actually be provided to user 112. Regardless of which method is employed, at block 210, after notification is received, user support services center 102 configures the replacement programmable device based on the user-specific data associated with programmable device 103 that is stored. At block 212, user support services center 102 provides the replacement programmable device to user 112.

At block 214, user support services center 102 determines whether the programmable device 103 can be returned to user support services center 102. In situations where programmable device 103 is actually lost or stolen, at block 222, user support center 102 may terminate user support services for programmable device 103. However, in situations where programmable device 103 is not lost or stolen, such as where it is merely inoperable or malfunctioning, at block 216, user 112 may provide programmable device 103 to user support services center 102 to be repaired. At block 218, user support services center 102 determines whether the programmable device 103 can be repaired. If programmable device 103 cannot be repaired, at block 222, user support center 102 may also terminate user support services for programmable device 103. If programmable device 103 is repaired, at block 220, user support services center 102 may provide the repaired programmable device 103 back to user 112 and user 112 may provide the replacement programmable device 608 (FIG. 6) back to user support services center 102. In either situation, while user 112 has replacement programmable device 608, user support services center 102 may provide user support services to replacement programmable device 608 being used by user 112.

II. Programmable Device

Figure 3:
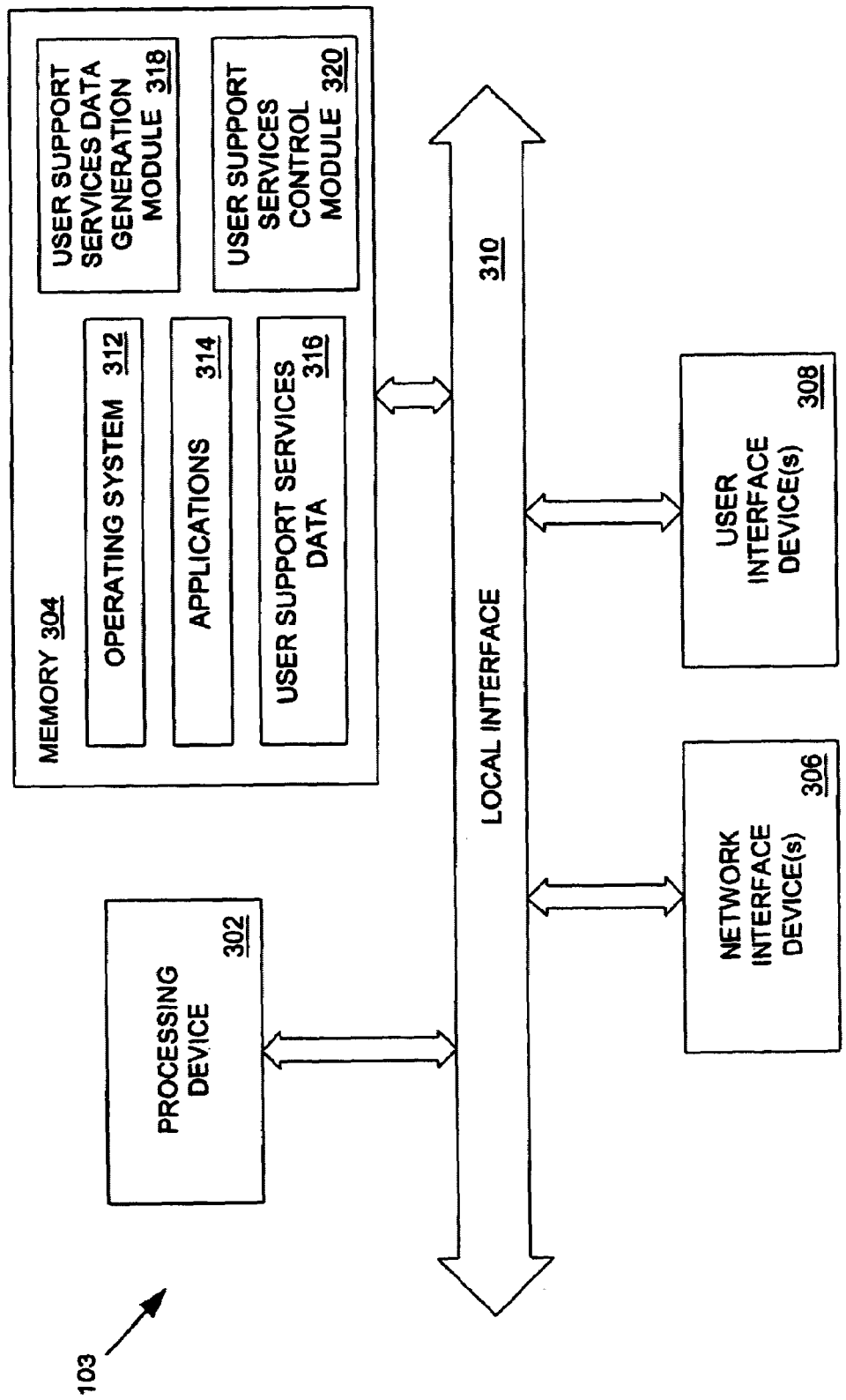
FIG. 3 is a schematic diagram of one of a number of embodiments of a programmable device of FIG. 1.

FIG. 3 illustrates a schematic diagram of one of a number of embodiments of a programmable device 103 of FIGS. 1 and 2. As stated above, programmable device 103 may be any of a variety of computing devices that are configured to provide a user application to a user 112 and are also configured to communicate with user support services center 102 via communications network 114. Programmable device 103 may comprise a processing device 302, memory 304, one or more network interface devices 306, and one or more user interface devices 308 interconnected via local interface 310. Memory 304 may comprise one or more user applications 314, user support services data 316, user support services data generation module 318, and user support services control module 320. In certain embodiments of programmable device 103, such as for a laptop PC 104, a PDA 108, and a personal computer 110, programmable device 103 may also comprise an operating system 312. Furthermore, as understood by one or ordinary skill in the art, programmable device 103 may further comprise any of a number of other components not illustrated in FIG. 3.

Applications 314, user support services data 316, user support services data generation module 318, and user support services control module 320 may be implemented in hardware, software, firmware, or a combination thereof. As illustrated in FIG. 3, in one of a number of possible embodiments, user support services data 316, user support services data generation module 318, and user support services control module 320 are implemented in software or firmware that is stored in memory and that is executed by processing device 302 or any other suitable instruction execution system. If implemented in hardware, as in alternative embodiments, user support services data 316, user support services data generation module 318, and user support services control module 320 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
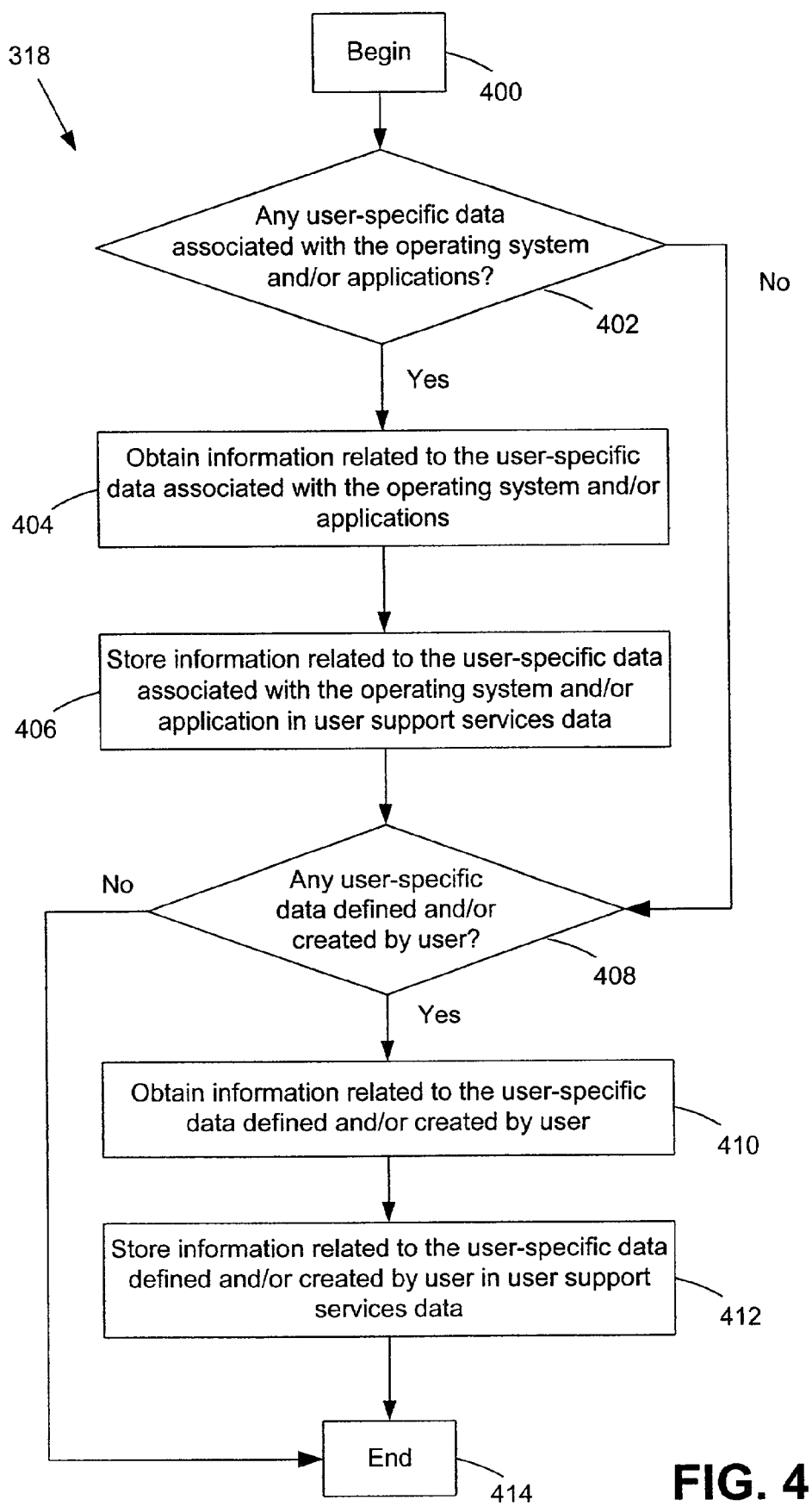
FIG. 4 is a flow chart illustrating the architecture, operation, and/or functionality of one of a number of possible embodiments of the user support services data generation module of the programmable device of FIG. 3.

FIG. 4 is a flow chart illustrating the architecture, operation, and/or functionality of one of a number of possible embodiments of user support services data generation module 318 of programmable device 103 of FIG. 3 for determining what user-specific data is to be provided to user support services center 102. After beginning at block 400, at decision block 402, user support services data generation module 318 determines what user-specific data associated with operating system 312 and/or applications 314 is to be provided to user support services center 102. This may be defined by user 112, predefined and/or controlled by programmable device 103, or defined and/or controlled by user support services center 102. If such user-specific data is to be provided to user control service center 102, at block 404, user support services data generation module 318 obtains the specified user-specific data associated with operating system 312 and/or applications 314. At block 406, user support services data generation module 318 stores the specified user-specific data associated with operating system 312 and/or applications 314 in user support services data 316. If no such user-specific data is to be provided to user control service center 102, or after such user-specific data is stored, user support services data generation module 318 determines, at decision block 408, what user-specific data defined and/or created by user 112 is to be provided to user support services center 102. If user 112 has defined and/or created additional user-specific data to be provided to user support services center 102, at block 410, user support services data generation module 318 obtains information related to the user-specific data defined and/or created by user 112. At block 412, user support services data generation module 318 stores the additional information in user support services data 316.

Figure 5:
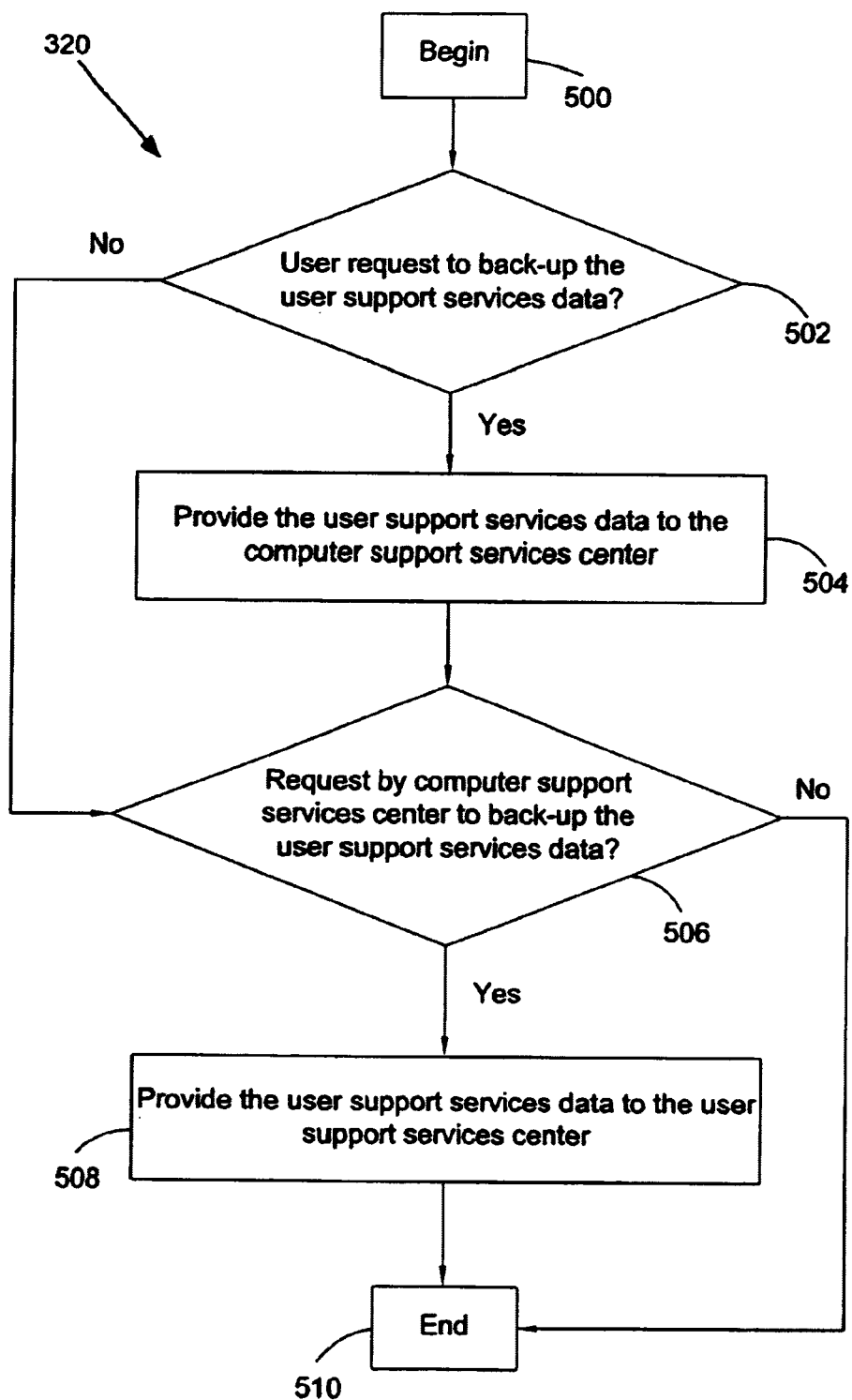
FIG. 5 is a flow chart illustrating the architecture, operation, and/or functionality of one of a number of possible embodiments of the user support services control module of FIG. 3.

FIG. 5 is a flow chart illustrating the architecture, operation, and/or functionality of one of a number of possible embodiments of user support services control module 320 of FIG. 3. In general, user support services control module 320 controls the transfer of user support services data 316 from programmable device 103 to user support services center 102. As stated above, there a variety of ways the information may be transferred. After beginning at block 500, at block 502, user support services control module 320 determines whether user 112 is initiating a request to back-up user support services data 316. If user 112 has initiated a back-up request, at block 504, user support services control module 320 provides user support services data 316 to user support services center 102. If user 112 has not initiated a back-up request, or after user support services control module 320 provides user support services data 316 to user support services center 102, at block 506, user support services control module 320 determines whether use support services center 102 has requested a back-up. If user support services center 102 has requested a back-up, at block 508, user support services control module 320 provides user support services data 316 to user support services center 102.

III. User Support Services Center

Figure 6:
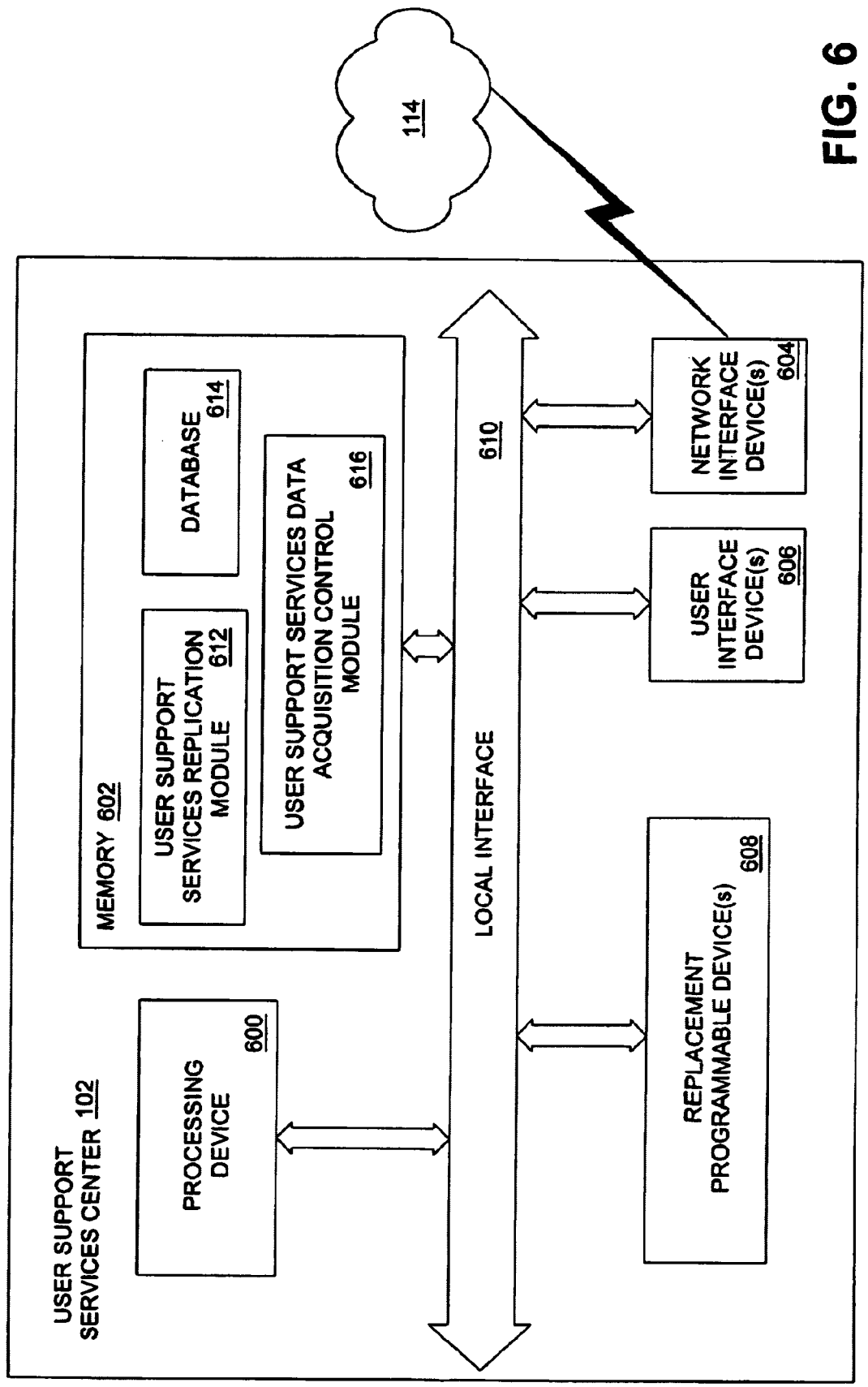
FIG. 6 is a schematic diagram of one of a number of possible embodiments of the user support services center of FIG. 1.

FIG. 6 is a schematic diagram of one of a number of possible embodiments of user support services center 102 of FIGS. 1 and 2. As stated above, depending on the particular needs and/or desires of the entity providing the user support services related to system 100, some of the various aspects of system 100 may be implemented in one embodiment, and the remaining aspects may be implemented in another embodiment. In other words, the functions of user support services center 102 may be provided by one entity, such as described above and below, or, as in alternative embodiments, may be provided by a collection of entities. For example, a large corporation that provides a programmable device 103, such as a laptop PC 104, a desktop 110, a PDA 108, or any other programmable device to employees, may implement some aspects of user support services center 102 within the technical support department of the corporation. In these situations, all direct communications with programmable devices 103 (described with respect to FIGS. 2–5) may occur via the corporation's internal communication network. The user-specific data associated with programmable devices 103 may be provided to an internal server via a LAN. However, the corporation may find it more feasible to outsource the remaining services related to user support services center 102. For example, the services related to configuring the replacement programmable device and delivering the replacement programmable device to the user 112 may be performed by a user support services provider or application service provider. Nonetheless, for purposes of clarity, the functions of user support services center 102 will be described with respect to FIG. 6 as if they are provided by a single entity.

User support services center 102 may comprise a processing device 600, memory 602, a plurality of replacement programmable devices 608, one or more user interface devices 606, and one or more network interface devices 604 interconnected via local interface 610. Memory 602 may comprise user support services replication module 612, a database 614, and a user support services data acquisition control module 616. Furthermore, as understood by one or ordinary skill in the art, user support services center 102 may further comprise any of a number of other components not illustrated in FIG. 6.

User support services replication module 612 and user support services data acquisition module 616 may be implemented in hardware, software, firmware, or a combination thereof. As illustrated in FIG. 6, in one of a number of possible embodiments, user support services replication module 612 and user support services data acquisition module 616 are implemented in software or firmware that is stored in memory 602 and that is executed by processing device 600 or any other suitable instruction execution system. If implemented in hardware, as in alternative embodiments, user support services replication module 612 and user support services data acquisition module 616 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
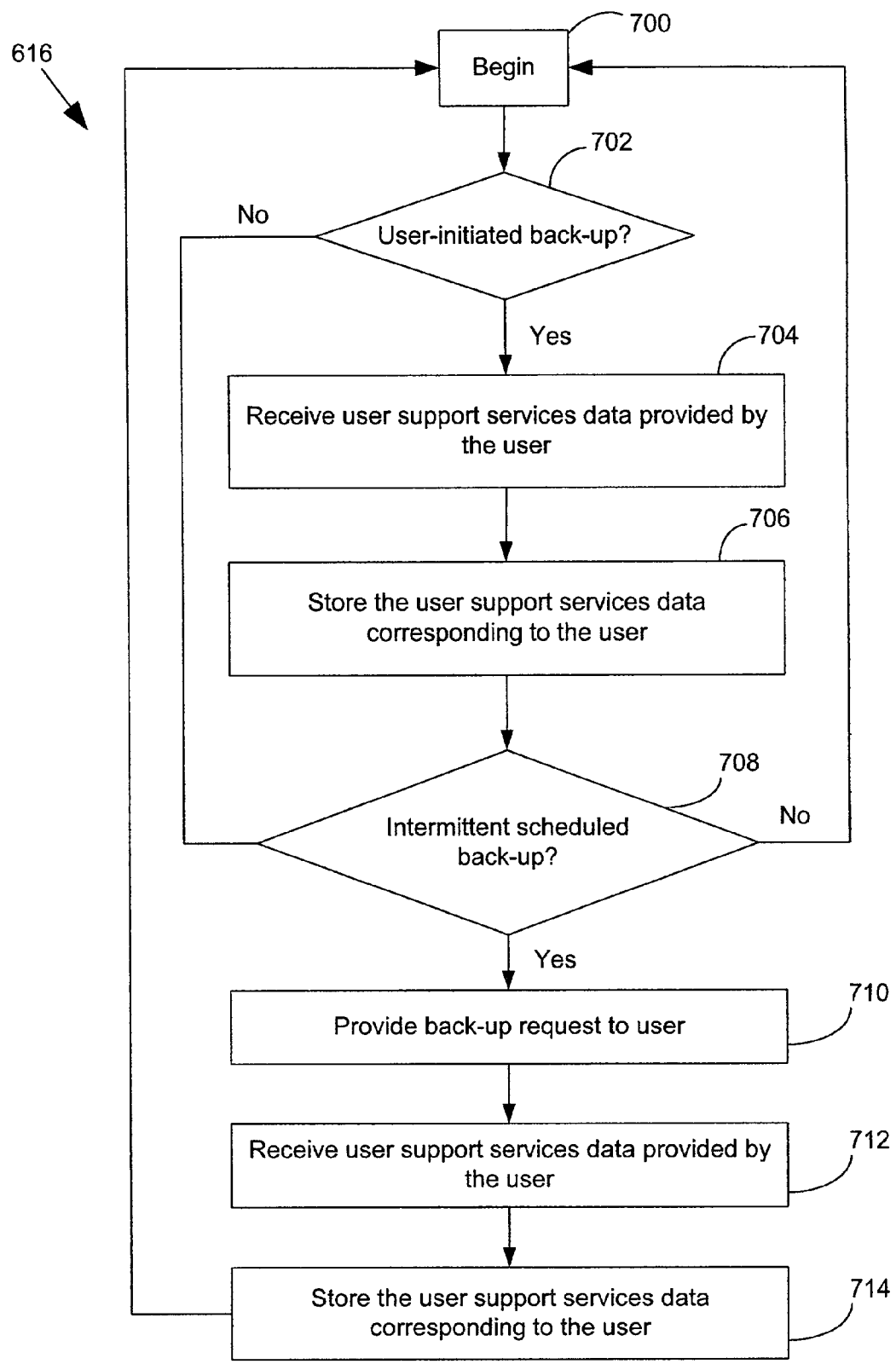
FIG. 7 is a flow chart illustrating the architecture, operation, and/or functionality of one of a number of possible embodiments of the user support services data acquisition control module of the user support services center of FIG. 6.

FIG. 7 is a flow chart illustrating the architecture, operation, and/or functionality of one of a number of possible embodiments of user support services data acquisition control module 616 of user support services center 102 of FIG. 6. After beginning at block 700, at block 702, user support services data acquisition control module 616 determines whether a user 112 is initiating a back-up of a programmable device 103. If a back-up is initiated by user 112, at block 704, user support services data acquisition control module 616 receives user support services data 316 from user 112. At block 706, user support services data acquisition control module 616 stores user support services data 316 in database 614. At block 708, user support services data acquisition control module 616 may initiate a back-up with programmable device 103. At block 710, user support services data acquisition control module 616 may provide a back-up request to programmable device 103. At block 712, user support services data acquisition control module 616 receives user support services data 316 provided by programmable device 103. At block 714, user support services data acquisition control module 616 stores user support services data 316 in database 614.

Figure 8:
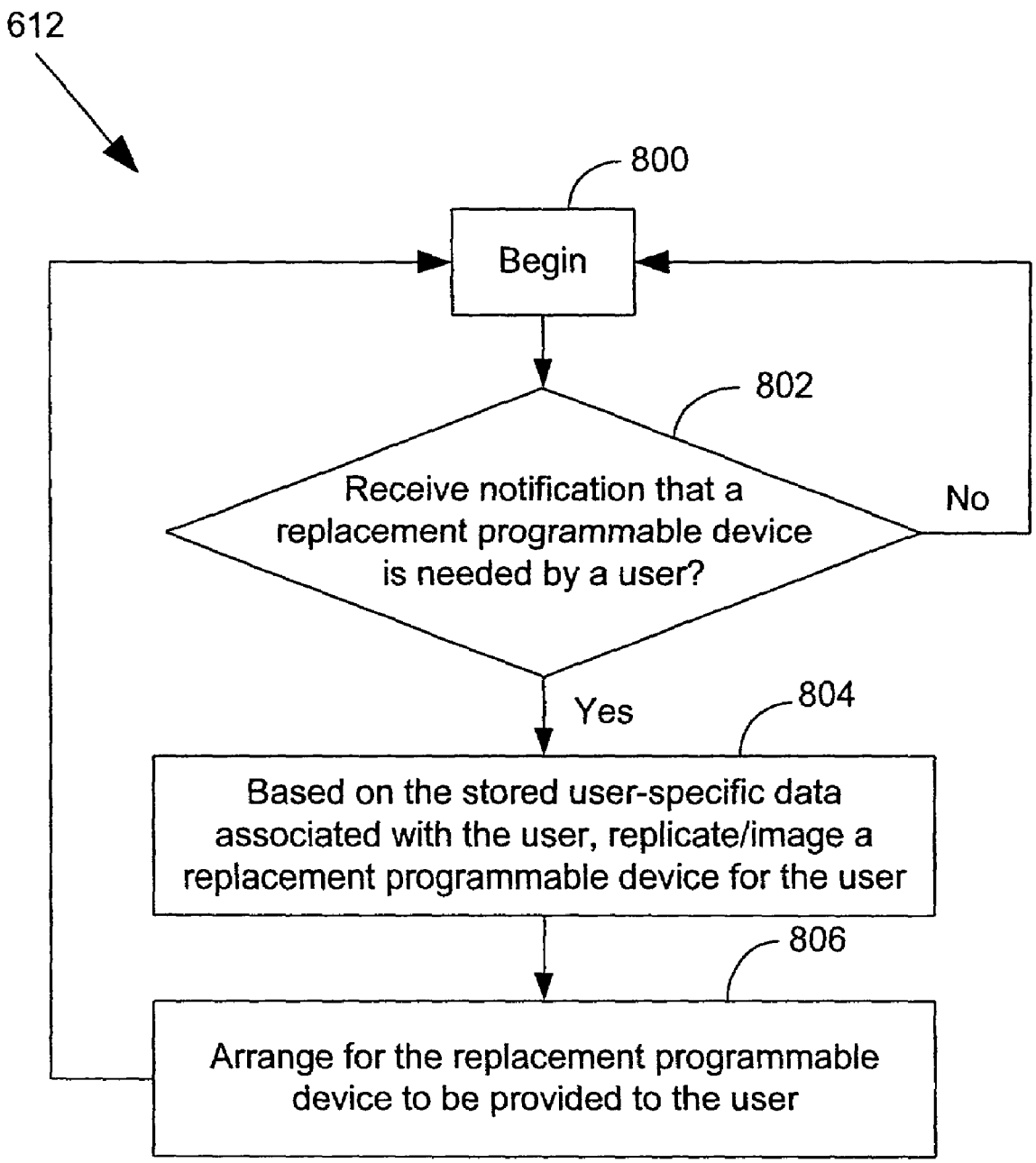
FIG. 8 is a flow chart illustrating the architecture, operation, and/or functionality of one of a number of possible embodiments of the user support services replication module of the user support services center of FIG. 6.

FIG. 8 is a flow chart illustrating the architecture, operation, and/or functionality of one of a number of possible embodiments of user support services replication module 612 of user support services center 102 of FIG. 6. After beginning at block 800, at block 802, user support services replication module 612 determines whether notification is received that a replacement programmable device 608 is needed by a user 112. As stated above, this notification may be received in a number of ways. For instance, user 112 may request a replacement programmable device 608 because programmable device 103 is lost, stolen, inoperable, or simply due to a minor malfunction. The request may be made, for example, via communications network 114, some other communications network, a telephone, electronic mail, or regular mail. The request from the user 112 may automatically trigger the notification to user support services center 102. In other embodiments, user support services center 102, or a service agent associated with user support services center 102, may perform some preliminary inquiry to determine whether a replacement programmable device 608 should actually be provided user 112. Regardless which method is employed, after notification is received, at block 804, user support services replication module 612 configures one of the replacement programmable devices 608 based on the user support services data 316 associated with user 112, which is stored in database 614. At block 806, user support services replication module 612 arranges for replacement programmable device 608 to be provided to user 112.

User support services data generation module 318, user support services control module 320, user support services replication module 612, and user support services data acquisition module 616, which each comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of programmable devices 103, user support control center 102, and system 100, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. A method for providing support services for a plurality of programmable devices, each of the plurality of programmable devices associated with a user, the method comprising:

electronically receiving at a service location user-specific data associated with one of the programmable devices and the corresponding user;

storing the user-specific data associated with the programmable device and the corresponding user;

initiating automatic back-up procedures for keeping the stored user-specific data current;

receiving notification that a replacement programmable device for the programmable device is needed by the user;

configuring the replacement programmable device at the service location using the user-specific data associated with the programmable device and the corresponding user before the user receives the programmable device and without establishing a connection between the service location and the user; and automatically repairing the programmable device.

2. The method of claim 1, further comprising providing the replacement programmable device to the user.

3. The method of claim 2, further comprising: receiving the programmable device;

providing the repaired programmable device to the user and receiving the replacement programmable device from the user.

4. The method of claim 3, further comprising receiving payment for providing the support services to the user.

5. A programmable device that provides a user application and is configured to communicate with a network, the programmable device comprising:

a processing device configured to control the operation of the programmable device;

a user interface configured to enable a user to interact with the user application;

a network interface device configured to enable the programmable device to communicate with the network; and memory comprising the user application and logic configured to provide user-specific data associated with the user application to a service center connected to the network, the user-specific data comprising information capable of being used to configure a replacement programmable device for the user;

a support device that cnfigures the replacement programmable device at the service center using the user-specific data associated with the programmable device before the user receives the programmable device and without establishing a connected between the service center and the user.

6. The device of claim 5, wherein the programmable device is a laptop computer.

7. The device of claim 5, wherein the logic is further configured to enable the user to customize the user-specific data provided to the network.

8. The device of claim 5, wherein the logic is further configured to provide the user-specific data to the network in response to a request from the network.

9. The device of claim 5, further comprising a programming interface configured to connect to and communicate with an external device which is adapted to program the programmable device according to the user-specific data provided to the network.

10. The device of claim 5, wherein the network interface device is further configured to enable the programmable device to be programmed according to the user-specific data via the network.

11. A system for providing support services to a plurality of programmable devices, each of the plurality of programmable devices associated with a user, the system comprising:
    means for electronically receiving at a service center user-specific data associated with each of the plurality of programmable devices and the corresponding user;
    means for storing the user-specific data associated with each of the plurality of programmable devices and the corresponding user;
    means for initiating automatic back-up procedures for keeping the stored user-specific data current;
    means for receiving notification that a replacement programmable device for one of the plurality of programmable devices is needed by the corresponding user;
    means for configuring the replacement programmable device at the service center using the user-specific data associated with the one of the plurality of programmable devices and the corresponding user before the user receives the programmable device and without establishing a connection between the service location and the user; and
    means for automatically repairing the programmable device.

12. The system of claim 11, further comprising means for providing the replacement programmable device to the corresponding user.

13. The system of claim 11, further comprising means for receiving payment for providing the support services to the corresponding user.

14. A system for providing support services to a plurality of programmable devices, each of the plurality of programmable devices associated with a user and configured to connect to and communicate with the system via a network, the system comprising:
    a processing device configured to control the operation of the system;
    a network interface device adapted to communicate with each of the plurality of programmable devices via the network;
    memory comprising logic configured to:
        receive user-specific data associated with each of the plurality of programmable devices and the corresponding user, the user-specific data comprising information capable of being used to configure a replacement programmable device for the user;
        store the user-specific data associated with each of the plurality of programmable devices and the corresponding user;
        automatically back-up the stored user-specific data for keeping the stored user-specific data current; and
        receive notification that a replacement programmable device for one of the plurality of programmable devices is needed by the corresponding user;
    a service center that configures the replacement programmable device at the service center using the user-specific data associated with the one of the plurality of programmable devices and the corresponding user before the user receives the programmable device and without establishing a connection between the service location and the user;
    automatically repair the programmable device and then delivering the repaired device to the user.

15. The system of claim 14, wherein the logic is further adapted to enable the user to customize the user-specific data provided to the network.

16. The system of claim 14, wherein the logic is further adapted to request that a replacement programmable device be configured based on the user-specific data associated with the one of the plurality of programmable devices and the corresponding user and be provided to the corresponding user.

17. The system of claim 14, wherein each of at least a portion of the plurality of programmable devices is a laptop computer.

18. A system for providing support services for a network supporting a plurality of programmable devices, each of the plurality of programmable devices associated with a user and configured to connect to and communicate with the network, the system comprising:
    a processing device configured to control the operation of the system;
    a network interface device adapted to communicate with the network;
    memory comprising logic configured to:
        receive user-specific data associated with one of the plurality of programmable devices supported by the network and the corresponding user, the user-specific data comprising information capable of being used to configure a replacement programmable device for the user;
        automatically back-up the stored user-specific data for keeping the stored user-specific data current; and
        receive notification that a replacement programmable device for one of the plurality of programmable devices supported by the network is needed by the corresponding user;
    a service center that configures the replacement programmable device using the user-specific data associated with the one of the plurality of programmable devices and the corresponding user before the user receives the programmable device and without establishing a connection between the service center and the user; and
    automatically repair the programmable device.

19. The system of claim 18, wherein the logic is further configured to submit a request that the replacement programmable device be delivered to the corresponding user.

20. The system of claim 18, wherein each of at least a portion of the plurality of programmable devices is a laptop computer.

* * * * *

UNITED STATES PATENT AND TRADEMARK OFFICE
CERTIFICATE OF CORRECTION

PATENT NO.         : 7,051,088 B2                                    Page 1 of 1
APPLICATION NO. : 09/855209
DATED              : May 23, 2006
INVENTOR(S)        : Robert Sesek It is certified that error appears in the above-identified patent and that said Letters Patent is hereby corrected as shown below:

In column 10, line 65, in Claim 5, delete "cnfigures" and insert -- configures --, therefor.

In column 11, line 2, in Claim 5, delete "connected" and insert -- connection --, therefor.

Signed and Sealed this

Twenty-fourth Day of March, 2009

JOHN DOLL
*Acting Director of the United States Patent and Trademark Office*